United States Patent
Sander et al.

(10) Patent No.: US 6,823,427 B1
(45) Date of Patent: Nov. 23, 2004

(54) SECTORED LEAST-RECENTLY-USED CACHE REPLACEMENT

(75) Inventors: Benjamin T. Sander, Austin, TX (US); Teik-Chung Tan, Austin, TX (US); Adam Duley, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/859,271

(22) Filed: May 16, 2001

(51) Int. Cl.$^7$ .............................................. G06F 12/00
(52) U.S. Cl. ...................... 711/136; 711/129; 711/133; 711/118
(58) Field of Search ................. 711/136, 129, 711/133, 118

(56) References Cited

U.S. PATENT DOCUMENTS

| | | | |
|---|---|---|---|
| 4,607,331 A | | 8/1986 | Goodrich, et al. |
| 5,210,845 A | * | 5/1993 | Crawford ..................... 711/128 |
| 5,224,217 A | | 6/1993 | Zangenehpour |
| 5,586,293 A | * | 12/1996 | Baron ......................... 711/118 |
| 5,724,547 A | * | 3/1998 | Iyengar ........................ 711/128 |
| 5,781,924 A | | 7/1998 | Zaitzeva et al. ............. 711/131 |
| 5,809,528 A | * | 9/1998 | Miller ......................... 711/136 |
| 5,974,507 A | | 10/1999 | Arimilli, et al. |
| 6,078,995 A | | 6/2000 | Bewick, et al. |
| 6,161,167 A | | 12/2000 | Witt |
| 6,408,364 B1 | * | 6/2002 | Tan ............................. 711/136 |

FOREIGN PATENT DOCUMENTS

GB   2 255 211   10/1992

OTHER PUBLICATIONS

U.S. patent application Ser. No. 09/528,041, entitled "An Apparatus and Method for Implementing a Least Recently Used Cache Replacement Algorithm", filed Mar. 17, 2000.

* cited by examiner

Primary Examiner—Kimberly McLean-Mayo
(74) Attorney, Agent, or Firm—Meyertons Hood Kivlin Kowert & Goetzel, P.C.; B. Noël Kivlin (57) ABSTRACT

Various methods and systems for implementing a sectored least recently used (LRU) cache replacement algorithm are disclosed. Each set in an N-way set-associative cache is partitioned into several sectors that each include two or more of the N ways. Usage status indicators such as pointers show the relative usage status of the sectors in an associated set. For example, an LRU pointer may point to the LRU sector, an MRU pointer may point to the MRU sector, and so on. When a replacement is performed, a way within the LRU sector identified by the LRU pointer is filled.

37 Claims, 7 Drawing Sheets

SECTORED LEAST-RECENTLY-USED CACHE REPLACEMENT

BACKGROUND OF THE INVENTION

1. Field of the Invention

This invention relates to caches and, more particularly, to a least-recently-used cache replacement system.

2. Description of the Related Art

Since main system memory is typically designed for density rather than speed, microprocessor designers have added caches to their designs to reduce the microprocessor's need to directly access main memory. A cache is a small memory that is more quickly accessible than the main memory. Computer systems may have a number of different levels of caches. For example, a computer system may have a "level one" (L1) cache and a "level two" (L2) cache. These caches are typically integrated with the microprocessor. Caches are typically constructed of fast memory cells such as static random access memories (SRAMs) which have faster access times than the memories used for the main system memory (typically dynamic random access memories (DRAMs) or synchronous dynamic random access memories (SDRAMs)). The faster SRAMs are not typically used for main system memory because of their low density and high cost.

Many other types of caching are also possible. For example, the main system memory may act as a cache for the system's slower direct access storage devices (e.g., hard disk drives). Other devices, such as hard drives, may also include internal caches to improve their performance.

When a microprocessor needs data from memory, it typically first checks its L1 cache to see if the required data has been cached. If not, the L2 cache is checked. At the same time, the data may be requested from memory, in case there is a miss in the L2 cache. If the L2 cache is storing the data, it provides the data to the microprocessor (typically at much higher rate and lower latency than the main system memory is capable of), and if the data was requested from memory, that request may be cancelled. If the data is not cached in the L1 or L2 caches (referred to as a "cache miss"), the data is read from main system memory or some type of mass storage device (e.g., a hard disk drive). Relative to accessing the data from the L1 cache, accesses to memory take many more clock cycles. Similarly, if the data is not in the main system memory, accessing the data from a mass storage device takes even more cycles.

Caches typically operate on the principal of locality of reference, which states that the data most recently used (and the data in that locality) is more likely to be accessed than the rest of the data. This principle holds because computer software typically has loops and branches that cause previously executed code to be re-executed. By storing recently accessed instructions and data in a cache, system performance may be increased because the microprocessor need not wait for the instructions and data to be read from main memory.

Microprocessor and computer system architects have taken the locality of reference principle one step further by using techniques such as, branch prediction to proactively store instructions and data in the cache before they are actually needed by the microprocessor. In addition, when an instruction or byte of data is read from memory, additional bytes following the instruction or data are read and cached. Once again, the principal of locality of reference dictates that these instruction and data bytes are more likely to be needed by the processor than the other data or instructions at large.

There are several different ways to map the system memory into the cache. One common approach utilizes an n-Way set-associative cache, in which the cache is segmented into sets. Each set contains n cache lines. A cache line is a sequential group of bytes (e.g., 32 or 64). For efficiency purposes, cache memory transactions are typically in cache lines rather than in single bytes. Cacheable locations in main memory may each be assigned to one of the sets of cache lines. As a result, each location may be cached in any one of the n locations within its assigned set. One special case of the n-Way set-associative cache is the direct-mapped cache. In a direct-mapped cache, n=1, and thus each memory location maps to only one location in the cache. Another special case of the n-Way set-associative cache is the fully associative cache. In this case, n=m, where m is the number of lines in the cache (and thus there is only one "set"). In this case, each memory location may map to any of the cache locations.

Two basic performance criteria for caches are hit ratio (i.e., the ratio of the memory accesses that are found in the cache to the total number of memory accesses) and search speed (i.e., how quickly a hit or miss determination can be made). In a direct-mapped cache, search speed is optimized at the cost of hit ratio. This is because it is relatively easy to determine hits/misses (since a memory location only maps to one cache line, only that line needs to be checked) but more difficult to have a high hit ratio since multiple memory locations map to a single cache line. Conversely, fully-associative caches optimize hit ratios while sacrificing search speed. Allowing all memory locations to map to any cache line improves the probability that there will be a hit but greatly increases the complexity of searches since all cache lines must be searched for each memory location. Set-associative caches attempt to compromise between the two by offering more associativity (and thus higher hit ratios) than direct-mapped caches while also offering faster search speeds than fully-associative caches.

Since cache size is limited by a number of factors (including die size, power consumption, and cost), care must be taken when loading information into the cache. Once particular area of concern for the designer arises when deciding a policy for overwriting or invalidating existing instructions and data in a cache to make room for new instructions and data. Thus, in set-associative caches where n>1 (and thus there are choices as to which line to cache a particular memory location), there needs to be some way to choose which of the possible cache lines to fill with new data. A common solution is to track the relative order of access to each cached memory location and then replace the least recently used instructions or data with new instructions or data. This solution is based on the principle that recently accessed cache lines are more likely to be accessed again. Other solutions include random replacement and first-in first-out techniques.

On average, least-recently used (LRU) cache replacement algorithms provide better performance than other algorithms. However, in order to determine the least recently used (LRU) cache line in an n-way set associative cache, conventional approaches require a significant amount of complex hardware, including counters and n-way multiplexers, to implement the LRU algorithm. Additionally, status bits for each cache entry track the usage of each entry. The number of status bits required to implement a conventional LRU algorithm for a set with n ways is typically n*log₂(n). When a new entry is made in the set, the status bits are scanned to determine which of the cache lines is the least recently used or invalid. The least recently used or invalid line is then evicted to make room for the new entry. Drawbacks of a conventional LRU replacement algorithm include the amount of hardware and number of status bits time required to implement the algorithm as well as the time and hardware required to scan for invalid entries in the set.

SUMMARY

Various embodiments of methods and systems for implementing a least recently used (LRU) cache replacement algorithm are disclosed. In a first embodiment, a computer system that includes a processor, a system memory, and an N-way set-associative cache coupled to the processor is disclosed. The N-way set-associative cache includes a memory that is logically divided into at least one set. Each set includes N ways (i.e., cache lines) that are each configured to store a line (e.g., a data or instruction line) from the system memory. For example, if there is only one set, N may be the number of lines in the memory and the cache will be fully-associative. Each set is further partitioned into several sectors that each include two or more of the N ways. The computer system may also include multiple usage status indicators that indicate the relative usage status of the sectors in the set. For example, in one embodiment, the computer system may include multiple pointer registers that each store a pointer value identifying one of the sectors in an associated set. The pointer registers may each have an associated usage status. Thus, if a first sector is the LRU sector in the set, the LRU pointer register may store a pointer value identifying that first sector. Similarly, a most recently used (MRU) pointer register may store a pointer value identifying the MRU sector in the set. The cache controller for the N-way set-associative cache is coupled to the pointer registers and may be configured to perform a fill in the set associated with the pointer registers by reading the value stored in the LRU pointer register and filling one of the ways within the LRU sector.

In one embodiment, each of the sectors may contain two ways. Since a single bit may uniquely identify each of the ways in each sector, each of the pointer registers may be configured to store a bit identifying which of the ways in one of the sectors is a LRU way. In these embodiments, the cache controller may be configured to perform a fill by reading the bit stored in the LRU pointer register and filling the LRU way within the LRU sector.

There may be the same number of pointer registers as there are sectors in the associated set. In such an embodiment, the cache controller may assign and/or update the pointer values so that only one pointer value stored in any of the pointer registers identifies a particular one of the sectors at any given time. Several comparators may be configured to compare the pointer values stored in the pointer registers to a sector identifier identifying a sector being operated upon. The cache controller may be configured to detect an error if more than one of the pointer values equals the sector identifier.

In some embodiments, the cache controller may be configured to update the pointer values stored in the pointer registers in response to an operation being performed on one of the ways in the first set. For example, if the operation affects the relative usage status of some of the sectors in the first set, the cache controller may update the pointer values so that the pointers consistently identify the relative usage status of the sectors in the set. Thus, if the operation is an invalidation, the cache controller may update the pointer values by updating the LRU pointer value to identify a sector containing a way invalidated by the operation and storing a pointer value stored in a next lower usage status pointer register in each non-LRU pointer register that indicates usage status lower than or equal to a pre-operation usage status of the sector containing the invalidated way. Alternately, if the operation results in a hit and, as a result of the hit, a hit way is not invalidated, the cache controller may update the pointer values by updating the MRU pointer value to identify a sector containing the hit way and storing a pointer value stored in a next higher usage status pointer register in each pointer register that indicates usage status higher than or equal to a pre-operation usage status of the sector containing the hit way. Or, if the operation was a fill, the cache controller may update the pointer values by updating the MRU pointer value to identify the pre-operation LRU sector and storing a pointer value stored in a next higher usage status pointer register in each non-MRU pointer register.

In other embodiments, a cache subsystem is disclosed. This cache subsystem may be used in a computer system, as described above, or in any other suitable system. For example, the cache subsystem may be used as a cache for a disk drive or storage array. The cache subsystem may include multiple multiplexers that are each configured to output a value to be loaded into a pointer register so that the pointer values can be updated.

In another embodiment, a method of filling an N-way set-associative cache is disclosed. The method includes identifying a least recently used (LRU) sector within a set. The set is partitioned into sectors, and each sector includes several ways. The LRU sector is identified using one or more usage status indicators that show the relative usage status of the sectors in the set. For example, multiple usage status pointers may correspond to the set. Identifying a LRU sector within the set may involve determining which sector the LRU usage status pointer points to, because the LRU usage status pointer points to the LRU sector in the set. The method may also involve storing the data line in one of a plurality of ways within the LRU sector, and, if storing the data line causes a change in usage status for any of the sectors in the set, updating one or more of the usage status pointers corresponding to the set. In some embodiments, the method may also involve identifying the LRU way within the LRU sector so that a more accurate LRU replacement algorithm may be implemented. For example, if each sector includes two ways, the LRU way in a sector may be identified by the least significant bit of the usage status pointer currently identifying that sector.

Yet another embodiment discloses a method of performing cache line operations upon an N-way set associative cache. The cache comprises one or more sets, and each set comprises N cache lines. The method includes performing an operation on a first cache line within a first sector within a first set. The first sector includes at least two of the N cache lines in the first set. In response to performing the operation, several pointers that are configured to point to the sectors within the set may be updated. For example, if the operation was a fill and the first sector comprises only valid cache lines after the fill, the MRU pointer may be updated to point to the first sector and the other pointers may each be updated to point to a sector that was pointed to by a next higher usage status pointer before the fill.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
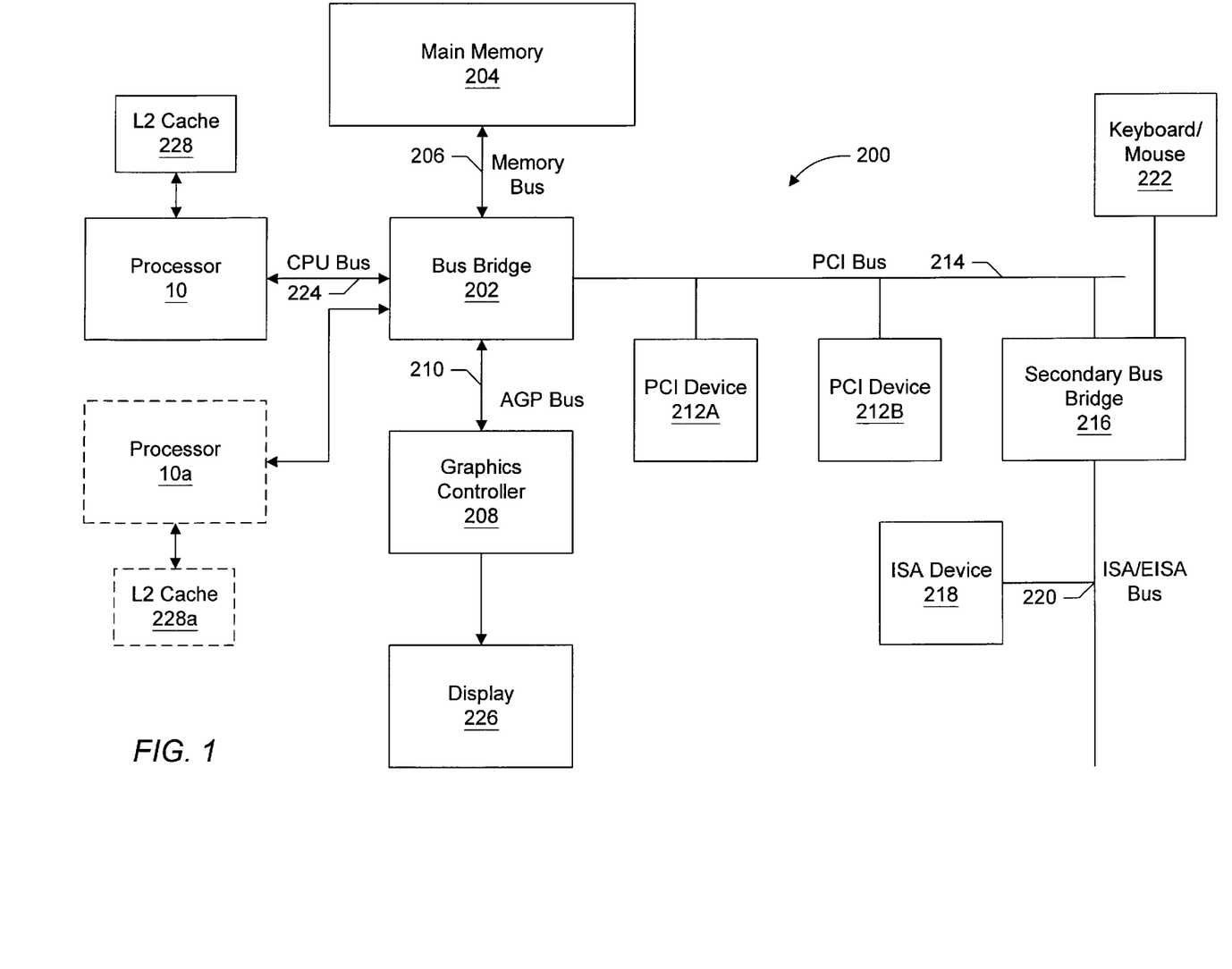
FIG. 1 is a block diagram of one embodiment of a computer system.

FIG. 1 shows a block diagram of one embodiment of a computer system 200 that includes a processor 10 coupled to a variety of system components through a bus bridge 202. Other embodiments of a computer system are possible and contemplated. In the depicted system, a main memory 204 is coupled to bus bridge 202 through a memory bus 206, and a graphics controller 208 is coupled to bus bridge 202 through an AGP bus 210. Several PCI devices 212A–212B are coupled to bus bridge 202 through a PCI bus 214. A secondary bus bridge 216 may also be provided to accommodate an electrical interface to one or more EISA or ISA devices 218 through an EISA/ISA bus 220. In this example, processor 10 is coupled to bus bridge 202 through a CPU bus 224 and to an optional L2 cache 228. In some embodiments, the processor 10 may include an integrated L1 cache (not shown).

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may incorporate additional functionality. An input/output controller (not shown), either external from or integrated with secondary bus bridge 216, may also be included within computer system 200 to provide operational support for a keyboard and mouse 222 and for various serial and parallel ports. An external cache unit (not shown) may also be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is shown in a backside configuration to processor 10. It is noted that L2 cache 228 may be separate from processor 10, integrated into a cartridge (e.g., slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures that can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

Figure 2:
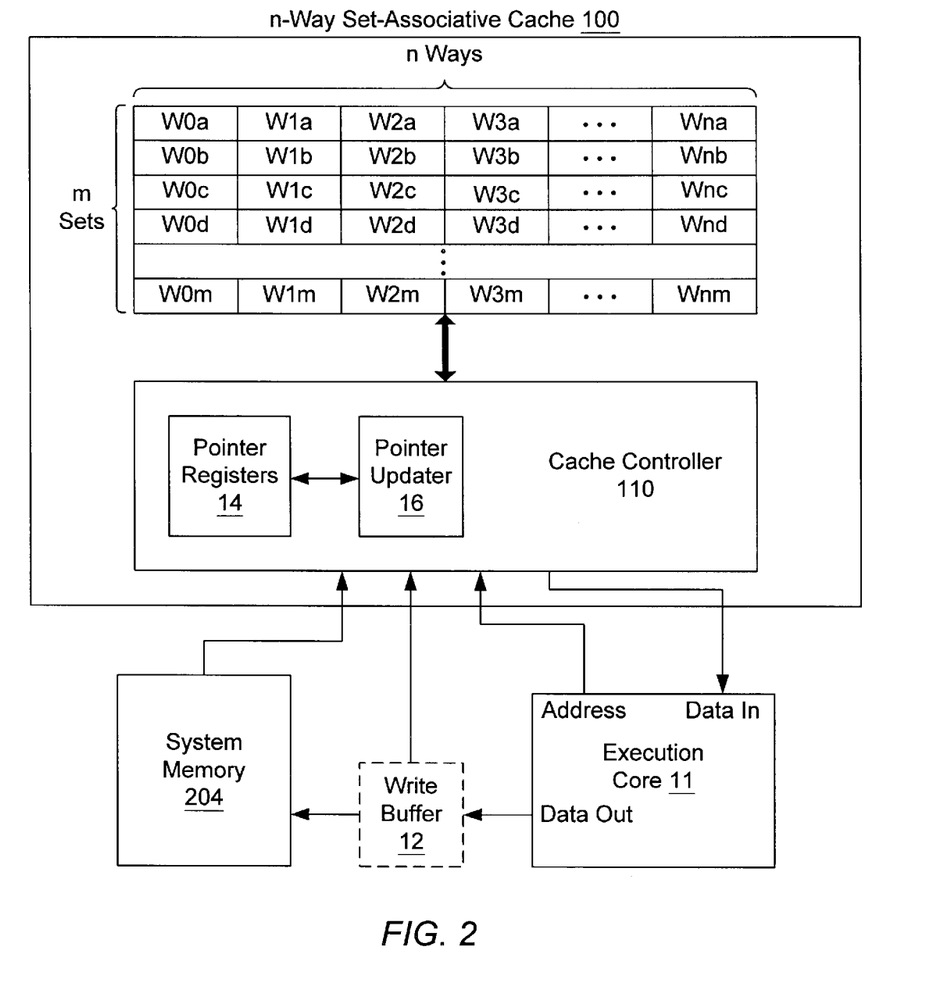
FIG. 2 shows one embodiment of an n-way set-associative cache.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 2) or may share CPU bus 224 with processor 10. Furthermore, processor 10a may be coupled to an optional L2 cache 228a similar to L2 cache 228.

Turning now to FIG. 2, one embodiment of an n-way set-associative cache 100 is shown. With respect to a computer system such as the one illustrated in FIG. 1, the cache 100 may be configured as a L1 or L2 cache 228 or any other level of cache used in a similar computer system. Furthermore, the cache 100 may be configured as an instruction cache, a data cache, or a unified cache for storing both instructions and data. In some embodiments, the cache 100 may be integrated with a processor.

As shown in the figure, execution core 11 is configured to communicate addresses and data with cache 100. Cache controller 110 is configured to receive address information from execution core 11. Cache controller 110 is also configured to receive data from system memory 204, write buffer 12, and/or execution core 11. Cache controller 110 is configured to use the address information to select the cache storage line within which to retrieve or store the corresponding data bytes. For example, the cache controller 10 may be configured to access a plurality of tags that track which entries are present in the cache 100. Cache 100 may be configured using a number of different levels of associativity. For example, in one embodiment, the cache 100 may be a fully-associative cache (i.e., n=the number of available lines in the cache), while in another embodiment the cache 100 may be a 2-way set-associative cache. The embodiment shown in the figure is an n-way set-associative configuration that comprises n cache lines for each set. These cache lines within a set are also referred to as cache ways, or simply ways.

The cache controller 110 may be configured to partition each set into one or more sectors, where each sector includes two or more ways, and to maintain one or more usage status indicators that indicate the relative usage status of these sectors. For example, an LRU usage status pointer may point to the LRU sector in the set. Alternately, status bits and/or counters may be used to track the relative usage status of each sector in the set. By partitioning the set into sectors and maintaining usage status indicators, a sectored LRU replacement algorithm may be implemented. In some embodiments, a sectored LRU algorithm may require less hardware and/or fewer status bits to implement than a true LRU algorithm. However, this increased efficiency may result in slightly decreased accuracy in some embodiments, as will be discussed in more detail below.

Upon receiving new data, the cache controller 110 is configured to store the data in one of the n cache lines in the set into which the memory location of the data bytes maps. In this embodiment, the cache controller 110 is configured to store the data in a way within the least recently used sector of the set. For example, the cache controller 110 may be configured to ascertain the LRU sector of the set by determining which sector a LRU pointer corresponding to that set points to. Additional pointers corresponding to the set may indicate the usage status (i.e., relative state of more or less recently used) of other sectors within the set. For example, a most recently used pointer may point to the most recently used sector in the set. In some embodiments, once the LRU sector is identified, the LRU way within that sector may be located using a LRU way pointer or indication.

The number of sectors may vary depending on the associativity of the cache and how many ways are assigned to each sector. For example, in an 8-way set-associative cache where two ways/sector are desired, there may be 4 sectors in each set. Alternately, in a 16-way set-associative cache with 2 ways per sector, there may be 8 sectors in each set. The size of the usage status pointers may also vary depending on the number of sectors. For example, if there are 4 sectors per set, the sector pointers may be at least $\log_2(4)=2$ bits in size so that the pointer values can uniquely identify each sector in the set. The set of usage status pointers may include a LRU pointer configured to indicate a LRU sector and a most recently used (MRU) pointer configured to indicate a MRU sector. Additional usage status pointers may be assigned to indicate gradations of usage status existing between LRU and MRU. Thus, in some embodiments, there may be the same number of pointers as there are sectors so that each sector's relative usage status can be determined based on which pointer is currently pointing to that sector.

By maintaining usage status indicators that track the usage status of the sectors within the set, a sectored LRU algorithm may be used to select which way to replace when performing a cache fill. In a preferred embodiment, a sectored LRU algorithm may require less hardware and/or fewer status bits than a true, non-sectored LRU algorithm. Additionally, in embodiments using pointers, by assigning the usage status pointers to point to sectors, fewer and smaller pointers may be used to implement the pointer-based LRU algorithm than would be used if the pointers pointed to ways. These usage status pointers may be stored in pointer registers 14 and updated by pointer updater 16 in cache controller 10.

Figure 3A:
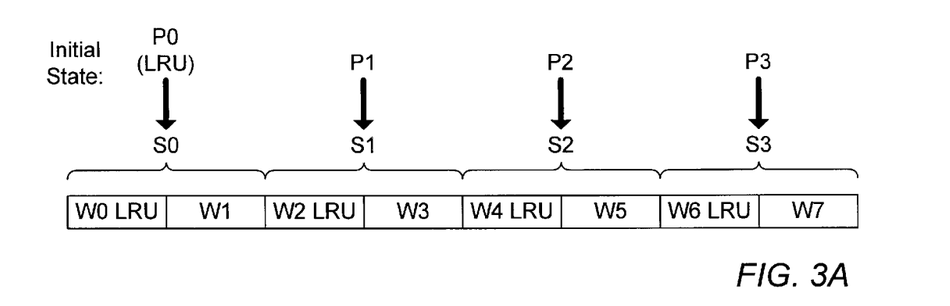
FIG. 3A illustrates one embodiment of a set of sector pointers.

FIG. 3A shows one example of how pointers may be assigned to sectors in an 8-way set-associative cache where there are 2 ways/sector. In the embodiment shown in FIG. 3A, the pointers P0–P3 form a monotonic set that shows the relative usage status of each sector. Thus, in this example, the LRU pointer, P0, indicates the least recently used sector and the MRU pointer, P3, indicates the most recently used sector. The remaining pointers may indicate the relative status of the other sectors, and thus P1 may point to a sector used more recently than P0, and P2 may point to a sector used more recently than P1.

As FIG. 3A also shows, the LRU way within each sector may be tracked in some embodiments. This may allow a more accurate LRU replacement algorithm to be implemented. In this example, since there are two ways per sector, 1 bit may be used to track the LRU way. Thus, in one embodiment, a 1-bit LRU way pointer or status bit may be maintained for each sector. In another embodiment, the least significant bit in the sector pointer may be used to indicate which way is the LRU way. Thus, in the example shown in FIG. 3A, each pointer may have at least 3 bits: 2 bits to identify a sector and 1 bit to identify a way within a sector. If the usage status pointers are each 3 bits in size, they may be able to uniquely identify both a sector (using the most significant 2 bits) and a way within that sector (using the least significant bit). In other embodiments, there may be more than two ways in each sector, and thus more bits may be used to track the LRU way. Generally, in an embodiment where the sector pointers indicate both a particular sector and the LRU way within that particular sector, the size of the sector pointers is equal to the sum of the number of bits used to uniquely identify a sector within a set ($\log_2$(number of sectors in the set)) and the number of bits used to uniquely identify a way within a sector ($\log_2$(number of ways per sector)). For example, if there are 16 ways in a set and two ways per sector, at least 3 bits are used to uniquely identify each of the 8 sectors and at least 1 bit is used to uniquely identify either of the 2 ways in each sector.

Some embodiments may only track the LRU sector and implement a less accurate LRU replacement algorithm. For example, such an embodiment may randomly replace a way within the LRU sector. In these embodiments, the usage status of each way within a sector may not be tracked, reducing the hardware requirements to implement the sectored LRU algorithm. However, the somewhat reduced hit ratios of these embodiments may be less desirable than the hit ratios of embodiments implementing more accurate LRU algorithms.

Note that a sectored LRU replacement algorithm may produce different results than a true LRU replacement algorithm (e.g., an algorithm that tracks the LRU way in each set instead of the LRU sector in each set). For example, in an embodiment that uses usage status pointers, assume a set in an 8-way set associative cache is partitioned into four sectors, S0–S3, each sector contains 2 ways, and the sector pointers initially indicate that S0 is the LRU sector, S2 is more recently used than S1, and S3 is the MRU sector. Furthermore, assume the LRU way is tracked (e.g., using the least significant bit of each sector pointer value). If four consecutive cache fills F1–F4 are performed on this set, the LRU way in each of the sectors may be filled (and consequentially, each filled way may become the MRU way in its sector). To reflect the changed usage status resulting from the four fills F1–F4, the sector pointers may be updated, and thus they may indicate that S0 is again the LRU sector after fills F1–F4 complete. If a fifth fill F5 to the set occurs at this point, the LRU way in S0 (the one not filled by F1) may be filled. If three consecutive cache accesses then hit in S1, S2, and S3 in the ways filled by F2–F4 (the MRU ways in sectors S1–S3), the sector pointers may be updated to reflect the change in usage status, and thus at the end of the sequence of accesses, S0 will again be the LRU sector. At this point, since S0 is the LRU sector, a fill F6 will replace the LRU way in S0, which is the way filled by F1. In contrast, if a true LRU algorithm is being used for the same series of instructions, the true LRU algorithm may select one of the LRU ways in sectors S1–S3 (which have not yet been accessed or filled) to be filled in response to fill request F6. Thus, in some situations, a sectored LRU replacement algorithm may not provide as much accuracy as a true LRU algorithm.

Also note that more levels of partitioning may be used when implementing a LRU replacement algorithm using sector pointers. For example, assume a 32-way set-associative cache is partitioned into 4 sectors that each contain 8 ways. Usage status indicators such as pointers may be used to track the relative usage status of each sector. Each sector may then. be partitioned into 4 subsectors that each contain 2 ways. Additional subsector usage status indicators may be used to track the relative usage status of the subsectors in each sector. Other embodiments may implement additional levels of partitioning.

A cache such as cache 100 may contain unknown values following power up. Thus, in many embodiments, cache lines or ways are marked as invalid (e.g., by clearing a validity bit) at startup. When implementing a sectored LRU algorithm using pointers, it may be useful to arbitrarily choose an initial pointer assignment. For example, in FIG. 3A, the pointer assignment shown may be used as an initialization assignment. Thus, the first time that the set is accessed, if none of the cache lines within the set are valid, the pointers may be initialized to indicate that sector 0 is the LRU sector, W0 is the LRU way within sector 0, and so on, as shown in FIG. 3A. In this embodiment, the pointers are initialized so that each pointer points to a different sector, and thus no two pointers point to the same sector. While FIG. 3A shows one possible initialization assignment, many other initialization assignments are possible and contemplated. Note that the set of pointers indicates the relative usage of each sector, and thus the fact that any particular pointer points to a sector does not indicate whether that sector is valid or not. For example, at initialization, all of the sectors are invalid, even the MRU sector pointed to by P3.

Assuming the pointers are initialized to the values shown in FIG. 3A, the first cache fill will replace the least recently used way in the least recently used sector. Thus, since the LRU pointer P0 points to sector 0 and way 0 is the least recently used way in LRU sector, way 0 will be replaced on a LRU replacement cache fill. Once way 0 is filled, the pointers may be updated to reflect the resulting change in the relative usage status of the ways and/or sectors. This changed status is illustrated in FIG. 3B.

Figure 3B:
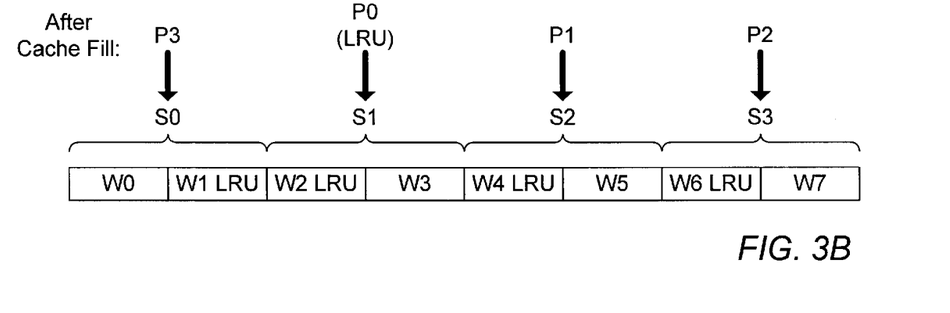
FIG. 3B shows how the pointers from FIG. 3A may be modified according to one embodiment.

As FIG. 3B shows, way 0 may be promoted to the most recently used way within sector 0 as a result of the cache fill. Also, sector 0 may be promoted to the most recently used sector by changing P3 to point to S0 (as opposed to S3, to which P3 initially pointed). Furthermore, the usage status of each sector with a usage status higher than sector 0's pre-fill usage status may be demoted. Accordingly, P0 may be modified to point to S1 (which was formerly pointed to by P1), P1 may be modified to point to S2 (which was formerly pointed to by P2), and P2 may be modified to point to S3 (which was formerly pointed to by P3). Thus, as a result of the cache fill, the filled way may be promoted by the MRU pointer taking the value of the LRU pointer. Furthermore, all the other pointers may take the value of the pointer indicating the next higher usage status, effectively demoting the sectors identified by these values.

Figure 3C:
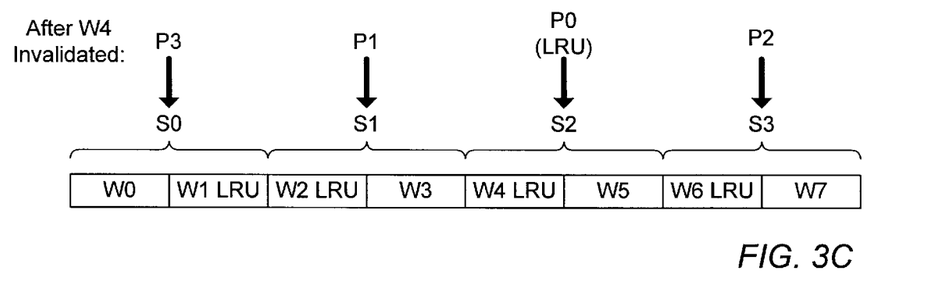
FIG. 3C shows how the pointers from FIG. 3B may be modified according to one embodiment.

FIG. 3C shows how the pointers may be modified in response to a cache line invalidation, assuming the pointers' previous values are those shown in FIG. 3B. In FIG. 3C, way 4 has been invalidated. For example, cache line 4 may be invalidated as a result of a probe indicating that data stored in way 4 is being updated in another memory (e.g., another cache or system memory). Since way 4 has been invalidated, it may be demoted to the least recently used way (although in this example, way 4 was already the least recently used way in its sector). Furthermore, sector 2 may be demoted to the least recently used sector as a result of the invalidation. Thus, P0 may be modified to point to S2. As S2 is demoted, the sectors with lower usage status than S2 may be promoted to higher usage status by having the pointers (other than P0) indicating equal or lower usage status than S2's pre-invalidation status take the value of the next lowest usage status pointer. Thus, sector 1 may be promoted by having P1 take P0's value, causing P1 to point to sector 1.

Other operations may also affect the usage status of a sector. A cache hit may result in a hit way being promoted to MRU way and the sector containing the hit way being promoted to MRU sector. However, this may vary depending on the configuration of the cache. For example, the cache may be an L2 cache that is exclusive with respect to an L1 cache (i.e., the L2 only stores lines that are not present in the L1). If there is a hit in the exclusive L2 cache, the data in the hit way may be copied to the L1 cache and the hit way in the exclusive L2 cache may be invalidated to maintain exclusivity. Accordingly, an exclusive L2 cache hit may be treated as an invalidation and thus result in demotion instead of promotion. One exception to this may arise if the exclusive L2 cache stores translation lookaside buffer (TLB) information and the TLB data is not copied to the L1 cache on a TLB hit. In that embodiment, a TLB hit in a cache line may cause that cache line's usage status to be promoted instead of causing the cache line to be invalidated and/or its usage status.demoted. If instead the cache is a non-exclusive cache, a hit may not result in an invalidation and thus the hit sector/way may be promoted to MRU sector/way as a result of the hit. In the remainder of this disclosure, the term "hit" includes hits that result in usage status promotion and the term "invalidation" includes hits that result in usage status demotion, unless otherwise indicated.

In many embodiments, P0 may be configured to only point to a valid sector (i.e., a sector containing no invalid ways) if all other sectors in the set are valid. Thus, so long as at least one sector in the set is invalid, P0 may not point to a valid sector. In these embodiments, the validity of the sector pointed to by P0 may indicate the overall validity of the set. For example, if P0 points to a sector containing only valid ways, all sectors in the set may be assumed to contain only valid ways. One embodiment may implement this by not promoting the LRU sector due to a cache hit or fill unless all ways in that sector are valid after the hit or fill. Thus, the example shown in FIG. 3B may be modified so that the LRU way bit for S0 is still toggled after the fill, but the LRU pointer is not updated until either the remaining invalid way is filled or until another sector is demoted by an invalidation (such as shown in FIG. 3C).

Similarly, it may be desirable to prevent any sector that contains an invalid way from being promoted to the MRU sector. For example, in some embodiments, if a way within a non-MRU sector is invalid, a hit on a valid way within that sector may not result in that sector being promoted to MRU. Similarly, if a non-MRU sector includes an invalid way, filling one of the ways in that sector may not result in that sector being promoted unless all of the ways are valid after the fill. In embodiments implementing this restriction, fills may be directed towards invalid ways. In contrast, in embodiments that do not include this restriction, a situation may arise where the only invalid way in the set is in the MRU sector. If a fill occurs, a valid way in the LRU sector will be replaced, even though there is an invalid way in the MRU sector. Thus, if sectors are not promoted to MRU while they contain invalid ways, a more accurate LRU replacement may be performed.

Figure 4:
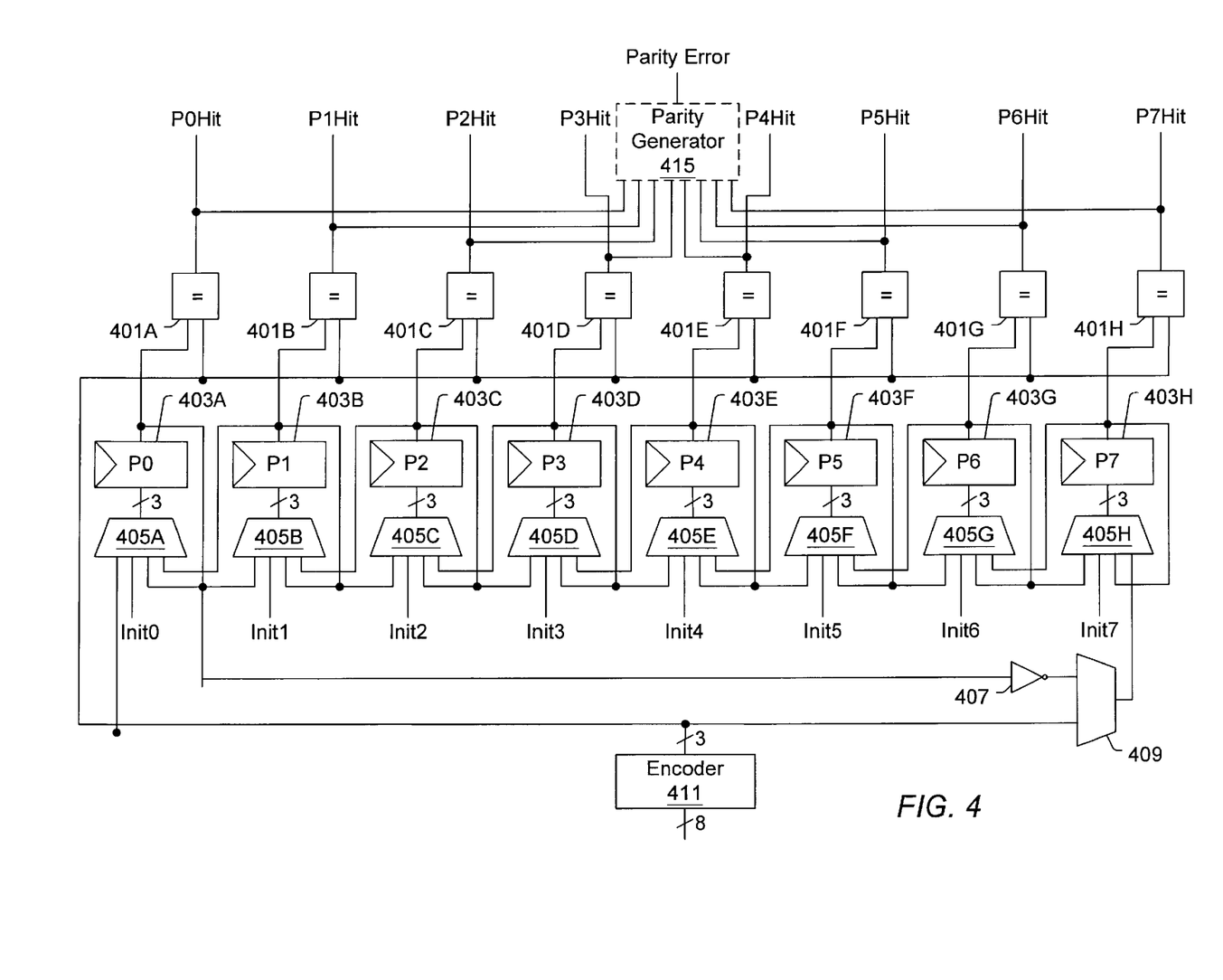
FIG. 4 is a block diagram of a system to update sector pointers according to one embodiment.

FIG. 4 shows one embodiment of a system for updating the usage status pointers to the sectors within a set. In this example, the cache using the algorithm is a 16-way set-associative cache having 2 ways per sector. Thus, there are 8 sectors and 8 sector pointers in this example. However, in other embodiments, there may be different numbers of sectors and/or ways per sector.

In this embodiment, 8 pointer registers 403 store pointers P0–P7. The pointer values stored in the pointer registers 403 identify one of the 8 sectors in a particular set. In this example, the pointers indicate usage status according to their numbering, and thus P0 points to the least recently used sector and P7 points to the most recently used sector. Likewise, pointers P1–P6 indicate graduations of usage status between least recently and most recently used. For example, P4 points to a more recently used sector than P2.

When an operation is being performed on a way within the set, several identifying signals may identify which sector is being operated on (e.g., filled, hit, invalidated, etc.). In this example, there are 8 identifying signals. These signals may be generated by logic in a cache controller. In response to one of the 8 identifiers indicating that an operation is being performed on a sector in the set, the encoder 411 outputs a 3-bit signal indicative of which sector is being operated on. Thus, if sector 4 is being operated on, the identifying signals may indicate '00001000' and the encoder 411 may output '100.' Note that the encoder 411 and the identifying signals may use other encoding schemes in other embodiments. Additionally, in another embodiment, the encoder 411 may output a 4-bit signal, where the most significant 3 bits identify which sector is being operated on and the least significant bit indicates which way within that sector is being operated on. Other input signals that identify the type of operation being performed (e.g., an invalidation, fill, hit, etc.) may also be received.

The comparators 401 may compare the sector identifier output by the encoder 411 with the pointer values stored in each of the pointer registers 403. If one of the pointer values equals the sector identifier output by the encoder 411, the pointer having that pointer value points to the sector being operated on. Thus, the usage status of the sector being operated may be identified by the comparator outputs. For example, if P4Hit='1' and all other PnHit values are '0', the sector being operated on has usage status corresponding to P4 (4 usage status gradations higher than LRU and 3 usage status gradations lower than MRU). The usage status of the sector being operated on may be used to update the usage status of other sectors after the operation. Thus, the comparator outputs PnHit may be used to control the outputs of the MUXs 405, which in turn control the values stored in the pointer registers 403.

In some embodiments, the pointers P0–P7 may be initialized and updated in such a way that only one pointer points to a given sector at any particular time. In these embodiments, only one of the comparators 401 may indicate equality for any given comparison. Thus, the comparator outputs may be used as parity bits. A parity generator 415 may be used to detect parity errors based on the comparator outputs. For example, if each comparator 401 outputs a '1' if the sector identified by the encoder 401 equals the sector pointed to by the associated pointer, only one comparator 411 should output a '1' at any given time. The parity generator 415 may include XOR logic configured to check for odd parity. If more than one comparator 401 outputs a '1,' or if none of the comparators output a '1,' the parity generator may detect a parity error. Other embodiments may use other parity detection logic. Embodiments where the comparator outputs may be used for parity detection may provide protection for the usage status pointers without requiring additional parity bits.

The MUXs 405 control which values are stored in the pointer registers 403. In general, the MUXs 405 may control the values loaded into their associated pointer registers 403 based on the type of cache operation occurring, that operation's effect on a cache line in the set, and the pre- and post-operation usage status of the sector being operated on. In this embodiment, each MUX 405B–G (except the MUXs controlling the LRU and MRU pointers (MUXs 405A and 405H), which have slightly different inputs) has four inputs: a left neighbor (i.e., the pointer value contained in the next lower usage status pointer register), a right neighbor (i.e., the pointer value contained in the next higher usage status pointer register), an initialization value, and a current value. Note that the terms "left" and "right" are used for ease of reference and that these terms do not imply any structural limitation on the physical orientation of the pointer registers relative to each other.

In embodiments using these four values as MUX inputs, the number of MUX inputs may be independent of both the number of ways per sector and the number of sectors. If the number of sectors is increased, a corresponding increase in the number of MUXs 405 may be used to implement the sectored LRU algorithm. As will be explained in more detail below, however, an increase in the number of ways per sector may involve an overall increase in the total amount of hardware used to perform a more accurate LRU algorithm that tracks both the LRU sector and the LRU way within that sector.

The MUXs 405A–H may cause the initialization values to be loaded into the pointer registers 403A–H whenever an initialization event occurs. For example, an initialization event may occur if all the ways in all the sectors are marked invalid or if a parity error is detected. Startup may be another initialization event.

The MUXs 405B–H may load the value stored in the next lower usage status pointer register 403A–G (i.e., the left neighbor in this example) into a pointer register 403B–H when usage statuses for various sectors are being promoted. For example, if an invalidation causes one of the sectors in the set to be demoted to the LRU sector, the sectors that had usage statuses lower than the pre-demotion usage status of the demoted sector may be promoted. Thus, if the sector pointed to by P6 was demoted to the LRU sector, pointers registers 403B–G may be updated with the pre-demotion pointer values stored in pointer registers 403A–F.

Similarly, a MUX 405A–G may load the pointer value contained in the next higher usage status pointer register 403B–H (i.e., the right neighbor in FIG. 4) when usage statuses for various sectors are being demoted. For example, when a cache fill causes the LRU sector to be promoted, the other sectors are demoted, and thus the pointer registers 403A–G (i.e., all the pointer registers except the MRU pointer register 403H) may load the pointer value contained in the next higher usage status pointer register 403B–H.

A MUX 405A–H may load a current value whenever an event occurs that doesn't change the usage status of the sector currently pointed to by the associated pointer. In another embodiment, in response to operations that do not change the pointer value, the sector pointer updater may be configured to inhibit the loading of the pointer register instead of loading the current value of a pointer register via one of the MUXs.

The MUX 405A controlling the value of the LRU pointer P0 has an input for the sector identifier output by the encoder 411 instead of an input for the pointer value stored in the next lower usage status pointer register. This is because (a) there is no lower usage status pointer register, and (b) if a cache line invalidation occurs, the sector containing the way being invalidated may become the LRU sector. Thus, the value of the LRU pointer P0 may become the sector identifier output by the encoder 411 if the operation being performed is an invalidation. Generally, the MUX 405A may update the LRU pointer register 403A so that the LRU pointer consistently points to whichever sector is currently the least recently used sector in the set.

The MUX 405H controlling the MRU pointer P7 has an input controlled by a second MUX 409 instead of a next higher usage status pointer value input (i.e., right neighbor input). The additional MUX 409 may select either the value stored in the LRU pointer register 403A or the value of the sector identifier output from the encoder 411. For example, if a cache fill is performed, the LRU way in the LRU sector may be filled. Then, the LRU sector may be promoted to the MRU sector, and thus the MRU pointer register 403H may load the value of the LRU pointer after a cache fill. Likewise, if a cache hit occurs, the sector identifier output by the encoder 411 may be loaded into the MRU pointer register 403H. In an embodiment where the least significant bit of the sector identifier indicates the relative usage status of the two ways in that sector, an inverter 407 may, if appropriate, toggle the least significant bit of the value stored in the LRU pointer register 403A to change the LRU way in that sector to the MRU way as that sector is promoted to MRU sector. For example, in this embodiment, 3 bits in each pointer may be used to indicate one of the sectors and 1 bit may indicate a LRU way within that sector. If the LRU way in that sector changes (e.g., as the result of a fill), the change can be noted by toggling the single bit that indicates the usage status of the ways. Note that in embodiments having more than two ways per sector, additional hardware may be used to modify the usage status of the ways.

In some embodiments, the MUXs 405H and 409 controlling the MRU pointer register value may be configured to load the LRU pointer value after a cache fill only if the sector pointed to by the LRU register 403A doesn't contain any invalid ways. Similarly, the LRU pointer may be configured to continue to point to the pre-fill LRU sector if the LRU sector contains at least one invalid way after the fill. These embodiments may prevent a sector containing any invalid ways from being promoted to MRU sector when any other sector(s) contain only valid ways. For example, if the LRU sector contains an invalid way after a cache fill, the filled way will be promoted to MRU way. On the next cache fill to this set, the remaining invalid way (now the LRU way) may be filled and become valid, and the sector may then be promoted to MRU sector if no other invalid ways are present. In embodiments where there are two ways per sector and the least significant bit of the pointer value identifies the LRU way, additional hardware (e.g., an inverter and/or another MUX) may be used to toggle the least significant bit of the pointer value stored in P0 after the LRU way in the sector pointed to by P0 is filled. This way, if there are two invalid ways in the LRU sector before a fill, the LRU may be filled and become the MRU way and the remaining invalid way may become the LRU way in the LRU sector as a result of the fill. Note that other embodiments, such as the one shown in FIG. 3C, may not include this restriction on the circumstances under which the LRU sector may be promoted.

In an embodiment where there are 2 ways per sector, way pointer updaters may have very simple configurations. For example, the way pointer updater may be configured to toggle the way bit in response to a hit, fill, or invalidation and to leave the way bit unchanged otherwise. If the way pointer is implemented as the least significant bit of the sector pointer, the system shown in FIG. 4 may be able to update both the sector and the way pointers with minimal or no adjustment.

If there are more than 2 ways per sector, the number of sectors and thus the corresponding size of the sector pointers for a given set may be reduced. In some embodiments implementing way pointers, additional hardware may be used to implement the way pointer updater. For example, if several bits are used in the way pointers, the way updater hardware may be similar to that used to update the sector pointers in FIG. 4. In some embodiments with more than two ways per sector, a different algorithm (e.g., random replacement) may be used to select a way within the LRU sector for replacement instead of maintaining way pointers.

If there are only two sectors per set, more complex way pointer updater hardware may be used. Since 1 bit may be used to identify each sector, this embodiment may effectively simplify the hardware allocated for sector pointers and sector pointer updaters.

Figure 5:
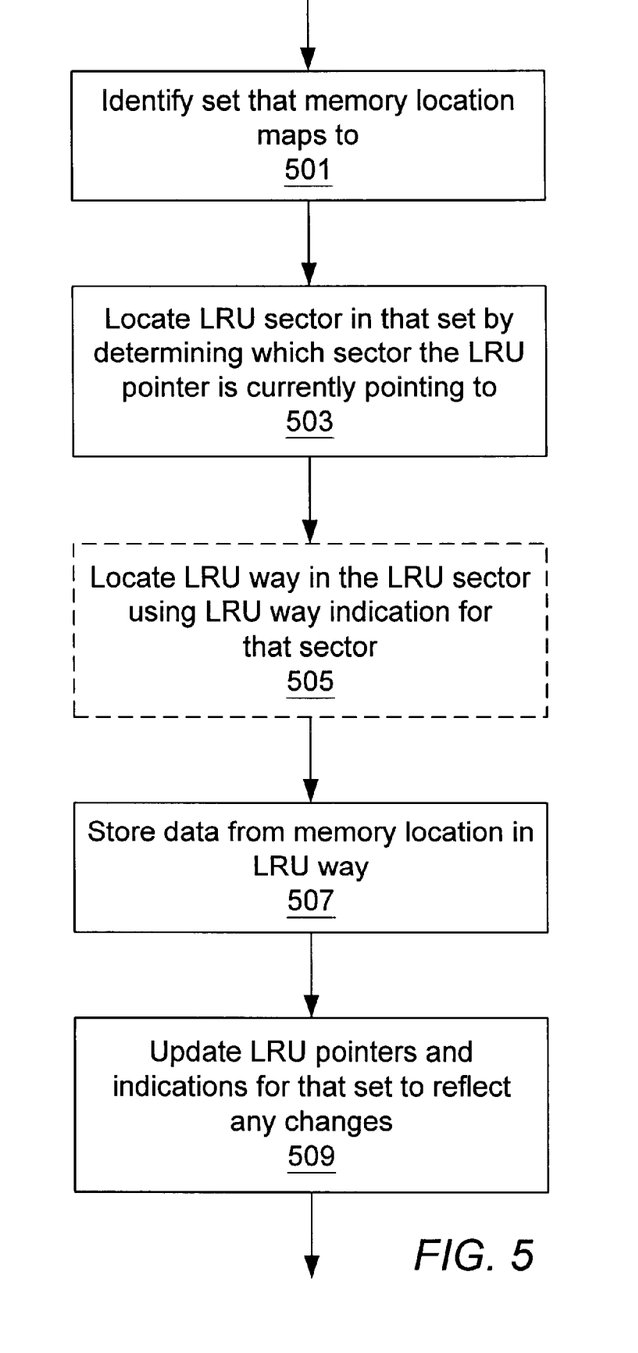
FIG. 5 is a flowchart illustrating how sector and way pointers may be used to implement a LRU replacement during a cache fill in one embodiment.

Turning now to FIG. 5, a flowchart shows how a set of usage status pointers may be used to implement an LRU cache replacement algorithm. At 501, a set is identified for the replacement. For example, if a cache fill from memory is being performed, the cache controller may identify which set that memory location maps to. The LRU sector in the set is located by determining which sector the LRU pointer is pointing to, as shown at 503. In embodiments where both the LRU sector and the LRU way are tracked, the LRU way within the LRU sector is identified using the LRU way pointer, as indicated at 505. For example, the LRU way pointer may be the least significant bit of the LRU sector pointer. Data may be stored in the LRU way within the LRU sector, at 507. In embodiments where the LRU way is not tracked, the data may be stored within any of the ways within the LRU sector. If any of the sectors' statuses have changed, the usage status pointer values may be updated to reflect the changed statuses. For example, the MRU pointer may be updated to point to the sector containing the filled way. In other embodiments, other usage status indicators may be used instead of pointers to track the relative usage status of the sectors.

Figure 6:
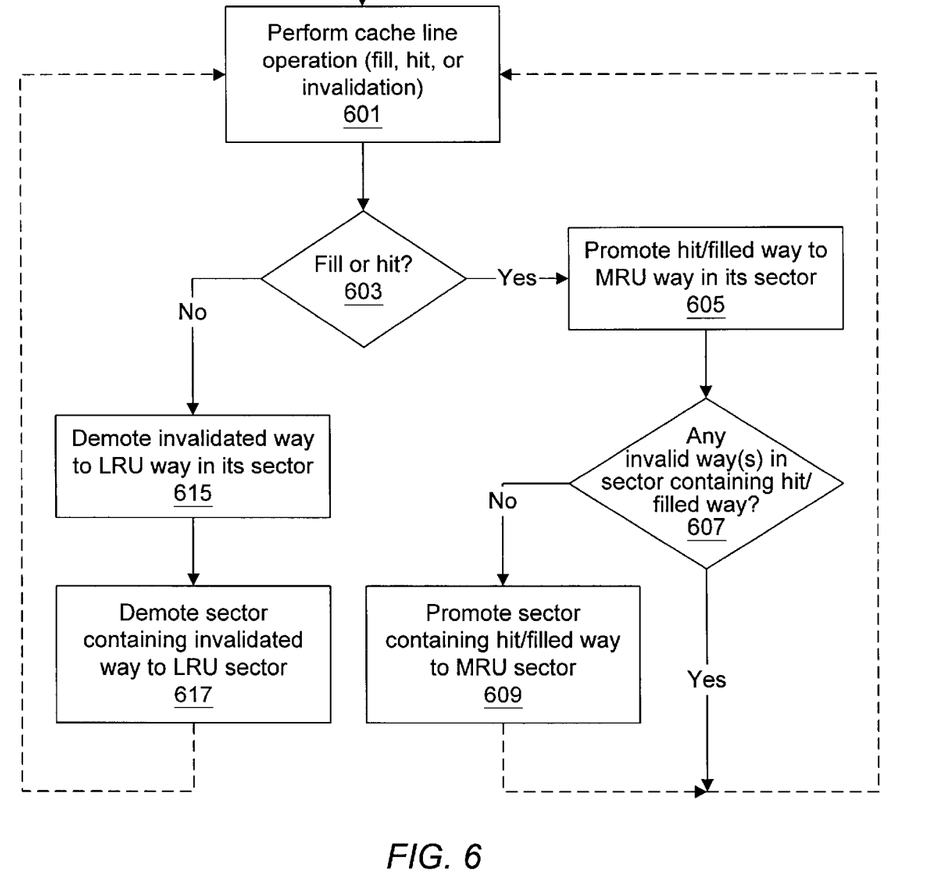
FIG. 6 is a flowchart showing how to update sector and way usage status according to one embodiment.

FIG. 6 shows how performing a hit, fill, or invalidation operation on a cache line may affect the usage status of the sector containing that line and the status of the line itself. Note that other operations that affect usage status are possible (e.g., initialization, etc.). If the operation is a fill, as indicated at 603 and 605 (or a hit, if the cache is configured so that a hit doesn't result in an invalidation), the filled line may be promoted to the MRU line in its sector. If all of the lines in that sector are valid after the fill, the sector may be promoted to MRU sector, at 608. In some embodiments, if any of the lines in the sector are invalid after the fill or hit, the usage status of the sector may remain unchanged so that a sector with an invalid line is never promoted to MRU sector.

If the operation is an invalidation, as indicated at 603 and 615, the invalidated line may be demoted to LRU line in its sector. Similarly, the sector containing the invalidated line may be demoted to LRU sector, at 617.

Figure 7:
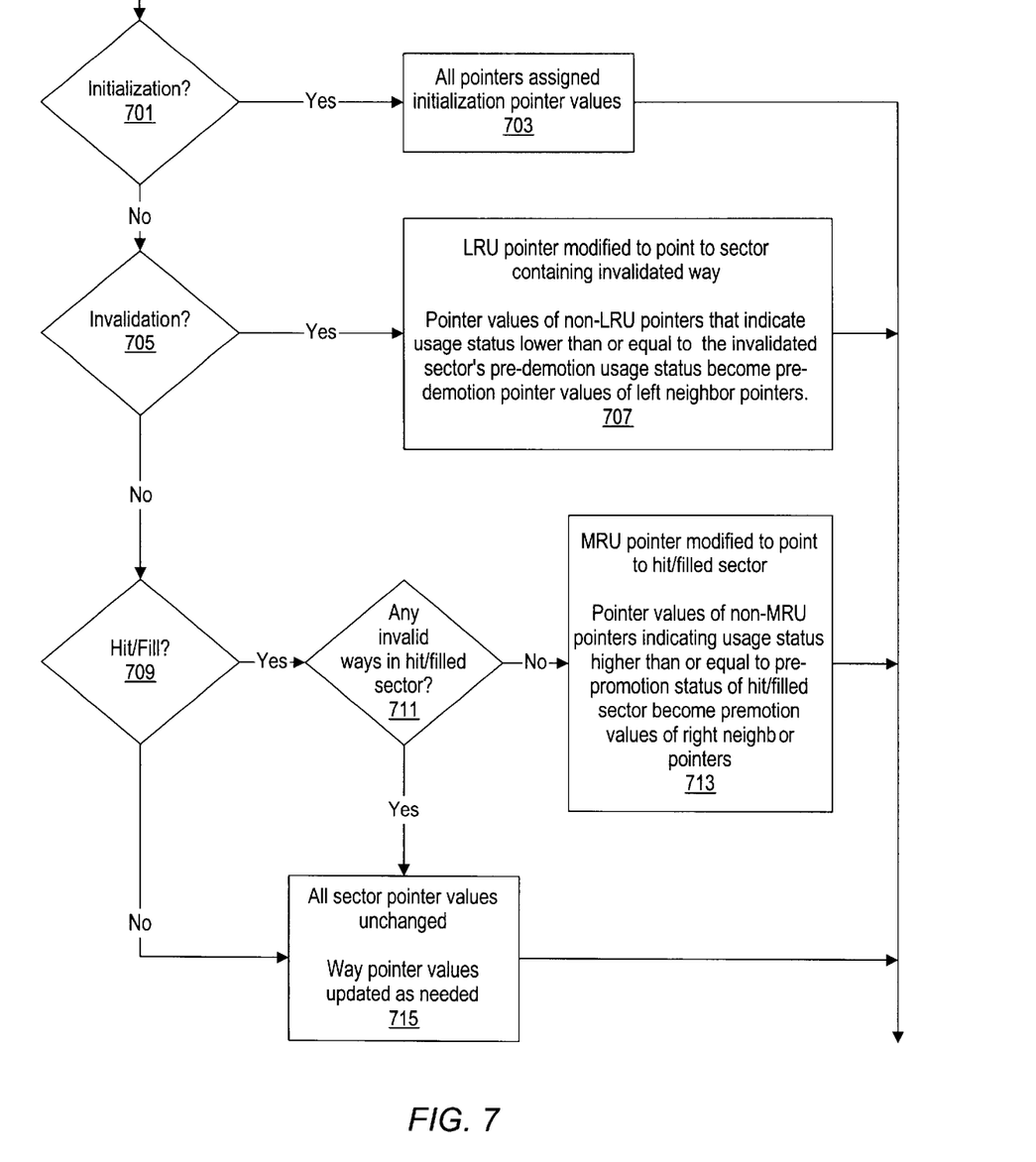
FIG. 7 is a flowchart illustrating how sector pointers may be updated to reflect the changed usage status of the sectors in the set in one embodiment.

FIG. 7 is a flowchart showing how a group of usage status pointers corresponding to a set may be updated in response to certain operations being performed on a way in the set. The pointers may be updated so that they consistently indicate the current usage status of each sector in the set. Thus, some operations may require some pointer values to be modified, causing some of the pointers change which sector they point to.

If an initialization even occurs, as indicated at 701, all of the pointers may be assigned their initialization value. For example, in an 8-way set-associative cache with two ways per sector, initialization values may be assigned by initializing the pointer values to those shown in FIG. 3A.

If a way within the set is invalidated, the sector containing that way may have its usage status demoted to LRU sector. Thus, the pointer value for the LRU pointer may be updated to identify the sector containing the invalidated way, at 715. Additionally, any sector(s) that have lower usage status than the pre-invalidation usage status of the sector containing the invalidated way may have their usage status promoted. Thus, the pointer values for the non-LRU pointers that indicate usage status lower than or equal to the demoted sector's pre-invalidation status may each be updated to equal the pre-invalidation value of the next lower usage status pointer (e.g., left neighbor in FIG. 4).

If a way is filled (or hit in embodiments where a hit doesn't lead to an invalidation), the sector containing that way may be promoted to MRU sector. The non-MRU pointers that indicate usage status higher than or equal to the pre-promotion status of the filled (or hit) sector may each be updated with the pre-promotion value of the next higher usage status pointer (e.g., right neighbor in FIG. 4).

As noted before, other sector-based replacement schemes may be implemented using devices other than pointers to track the relative usage status of the pointers. For example, in some embodiments, the cache controller may be configured to partition each line into sectors and to use status bits and/or counters to track the relative usage status of the sectors. In general, any suitable usage status indicator(s) (e.g., counters, pointers, status bits) may be used to track the relative usage status of the sectors in a set. In response to various cache operations (e.g., fills, invalidations, and hits), the cache controller may be configured to modify these usage status indicators to update the usage status of the sectors. For example, if the usage status indicators include counters, the cache controller may be configured to increment or decrement a counter when updating the usage status of a sector. These embodiments may also include multiple levels of subsectors, and each level of sectors and subsectors may have its own set of usage status indicators.

Numerous variations and modifications will become apparent to those skilled in the art once the above disclosure is fully appreciated. It is intended that the following claims be interpreted to embrace all such variations and modifications.

What is claimed is:

1. A computer system comprising:

a processor, a system memory;

an N-way set-associative cache coupled to the processor, wherein the cache comprises a memory logically divided into at least one set, wherein each set comprises N ways, wherein each set is further partitioned into a plurality of sectors, wherein each sector comprises a plurality of the N ways, and wherein each way is configured to store a line from the system memory; and a plurality of pointer registers each configured to store a pointer value identifying one of the sectors in an associated one of the sets, wherein a least recently used (LRU) pointer register associated with a first set is configured to store a LRU pointer value identifying a LRU sector within the first set, wherein a most recently used (MRU)) pointer register associated with the first set is configured to store a MRU pointer value identifying a MRU sector within the first set; and a cache controller coupled to the pointer registers and configured to perform a fill in the first set by reading the value stored in the LRU pointer register and filling one of the ways within the LRU sector in the first set.

2. The computer system of claim 1, wherein each of the sectors comprises 2 ways, and wherein each of the pointer registers is further configured to store a bit identifying which of the two ways in a respective one of the sectors is a LRU way.

3. The computer system of claim 2, wherein the cache controller is further configured to perform the fill by reading the bit stored in the LRU pointer register and filling the LRU way within the LRU sector.

4. The computer system of claim 1, wherein there are a same number of pointer registers as there are sectors in the associated one of the sets, and wherein the cache controller is configured to update pointer values so that only one pointer value stored in any of the pointer registers identifies a particular one of the sectors at any given time.

5. The computer system of claim 4, further comprising a plurality of comparators configured to compare the pointer values to a sector identifier identifying a sector being operated upon, wherein the cache controller is further configured to detect an error if more than one of the pointer values equals the sector identifier.

6. The computer system of claim 4, wherein the cache controller is further configured to update the pointer values stored in the pointer registers in response to an operation being performed on one of the ways in the first set that affects a relative usage status of the sectors in the first set.

7. The computer system of claim 6, wherein if the operation is an invalidation, the cache controller is further configured to update the pointer values by:

updating the LRU pointer value to identify a sector containing a way invalidated by the operation; and in each other pointer register that indicates usage status lower than or equal to a pre-operation usage status of the sector containing the invalidated way, storing a pointer value stored in a next lower usage status pointer register.

8. The computer system of claim 6, wherein if the operation results in a hit and, as a result of the hit, a hit way is not invalidated, the cache controller is further configured to update the pointer values by:

updating the MRU pointer value to identify a sector containing the hit way; and in each pointer register that indicates usage status higher than or equal to a pre-operation usage status of the sector containing the hit way, storing a pointer value stored in a next higher usage status pointer register.

9. The computer system of claim 6, wherein if the operation is a fill and, as a result of the fill, each way in the LRU sector is valid, the cache controller is further configured to update the pointer values by:

updating the MRU pointer value to identify the pre-operation LRU sector; and in each other pointer register, storing a pointer value stored in a next higher usage status pointer registers.

10. The computer system of claim 1, wherein the cache is a fully-associative cache.

11. A method of filling an N-way set-associative cache, comprising:

storing a plurality of usage status pointers, wherein each of the plurality of usage status pointers is stored in a corresponding one of a plurality of pointer registers;

identifying a least recently used (LRU) sector within a set, wherein the set is partitioned into a plurality of sectors, wherein each sector comprises a plurality of ways, wherein the plurality of usage status pointers correspond to the set, wherein said identifying comprises determining which sector a LRU usage status pointer points to, wherein the LRU usage status pointer points to the LRU sector;

storing a data line in one of a plurality of ways within the LRU sector; and if said storing causes a change in usage status for any of the sectors in the set, updating one or more of the usage status pointers corresponding to the set.

12. The method of claim 11, further comprising:

identifying a LRU way within the LRU sector; and wherein said storing further comprises storing the data line in the LRU way within the LRU sector.

13. The method of claim 12, wherein each sector comprises 2 ways.

14. The method of claim 13, wherein said identifying the LRU way within the LRU sector comprises checking a least significant bit in the LRU usage status pointer, wherein the bit indicates which of the 2 ways in the LRU sector is the LRU way.

15. The method of claim 12, wherein if, as a result of said storing, each way in the LRU sector is valid, said updating comprises updating a most recently used (MRU) usage status pointer to point to the current LRU sector, and updating each other usage status pointer to point to a sector pointed to by a next higher usage status pointer.

16. The method of claim 11, further comprising performing an operation on a first way within a first sector in the set and, in response to said performing, updating the usage status pointers by:

if the operation is an invalidation, updating the LRU usage status pointer to point to the first sector, and updating each other usage status pointer that indicates usage status lower than or equal to a pre-operation usage status of the first sector to point to a sector pointed to by a next lower usage status pointer; or if the operation results in a hit and, as a result of the hit, the first way is not invalidated, updating the most recently used (MRU) usage status pointer to point to the first sector, and updating each other usage status pointer that indicates usage status higher than or equal to a pre-operation usage status of the first sector to point to a sector pointed to by a next higher usage status pointer.

17. A method of performing cache line operations upon an N-way set associative cache comprising one or more sets, wherein each set comprises N cache lines, the method comprising:

performing an operation on a first cache line within a first sector of a plurality of sectors within a first set of the one or more sets, wherein the first sector comprises at least two of the N cache lines in the first set;

in response to said performing, updating a plurality of pointers configured to each point to one of the plurality of sectors within the first set, wherein the plurality of pointers comprise a least recently used (LRU) pointer and a most recently used (MRU) pointer, wherein said updating comprises:

if the operation was a fill and the first sector comprises only valid cache lines after said performing, updating the MRU pointer to point to the first sector and updating others of the pointers to each point to a sector that was pointed to by a next higher usage status pointer before said performing.

18. The method of claim 17, wherein said updating further comprises:

if the operation was an invalidation, updating the LRU pointer to point to the first sector and updating others of the pointers that indicate usage statuses lower than or equal to a usage status indicated by a second pointer that pointed to the first sector before said performing, wherein said updating others comprises causing the others of the pointers to each point to a sector that was pointed to by a next lower usage status pointer before said performing.

19. The method of claim 17, wherein said updating further comprises:

if the operation resulted in a hit and a way hit by the operation is not invalidated as a result of the operation, updating the MRU pointer to point to the first sector and updating others of the pointers that indicate usage statuses higher than or equal to a usage status indicated by a third pointer that pointed to the first sector before said performing, wherein said updating others of the pointers comprises causing the others of the pointers to each point to a sector that was pointed to by a next higher usage status pointer before said performing.

20. The method of claim 17, further comprising initializing the pointer values in response to an initialization event, wherein said initializing comprises assigning each pointer value an initial pointer value.

21. A cache subsystem comprising:

an N-way set-associative cache, wherein the cache comprises a memory logically divided into at least one set, wherein each set comprises N ways, wherein each set is further partitioned into a plurality of sectors, wherein each sector comprises a plurality of the N ways, and wherein each way is configured to store a line; and a plurality of pointer registers each configured to store a pointer value identifying one of the sectors in an associated one of the sets, wherein a least recently used (LRU) pointer register associated with a first set is configured to store a LRU pointer value identifying a LRU sector within the first set, wherein a most recently used (MRU) pointer register associated with the first set is configured to store a MRU pointer value identifying a MRU sector within the first set; and a cache controller coupled to the pointer registers and configured to read the value stored in the LRU pointer register when performing a fill in the first set and to fill one of the ways within the LRU sector in the first set.

22. The cache subsystem of claim 21, wherein the cache controller is further configured to update one or more of the pointer values stored in the pointer registers as a result of performing an operation on one of the N ways in the first set.

23. The cache subsystem of claim 21, further comprising a plurality of comparators configured to compare the pointer values stored in the pointer registers to a sector identifier identifying a sector being operated upon.

24. The cache subsystem of claim 23, further comprising a parity detector coupled to the comparators, wherein the parity detector is configured to detect a parity error if more than one of the pointer values equal the sector identifier.

25. The cache subsystem of claim 23, further comprising a plurality of multiplexers, wherein each multiplexer is configured to output a value to be loaded into an associated one of the pointer registers.

26. The cache subsystem of claim 25, wherein a first portion of the multiplexers each have one input coupled to receive a next higher usage status pointer register than their associated pointer register.

27. The cache subsystem of claim 25, wherein a first portion of the multiplexers each have one input coupled to receive a pointer value stored in a next lower usage status pointer register than their associated pointer register.

28. The cache subsystem of claim 25, wherein a first portion of the multiplexers each have one input coupled to receive a pointer value stored in their associated pointer register.

29. The cache subsystem of claim 25, wherein a first portion of the multiplexers each have one input coupled to receive an initialization pointer value for their associated pointer register.

30. The cache subsystem of claim 29, wherein none of the initialization pointer values are a same value.

31. The cache subsystem of claim 25, wherein a first multiplexer configured to output a value to be loaded into the LRU pointer register has an input coupled to receive the sector identifier, wherein if a way in the sector being operated on is invalidated, the first multiplexer will output the sector identifier to be loaded into the LRU pointer register.

32. The cache subsystem of claim 25, wherein a first multiplexer configured to output a value to be loaded into the MRU pointer register has an input coupled to receive the LRU pointer value stored in the LRU pointer register, wherein if a way in the sector being operated on is filled and, after the way is filled, the LRU sector contains no invalid ways, the first multiplexer is configured to output the LRU pointer value to be loaded into the MRU pointer register.

33. The cache subsystem of claim 32, further comprising an inverter coupled to the input of the first multiplexer, wherein the inverter is configured to toggle a least significant bit of the LRU pointer value that identifies a LRU way in the LRU sector.

34. The cache subsystem of claim 21, wherein each sector comprises more than 2 ways and is further partitioned into a plurality of subsectors, wherein each subsector comprises at least 2 ways.

35. A cache subsystem comprising:

an N-way set-associative cache, wherein the cache comprises a memory logically divided into at least one set, wherein each set comprises N ways, wherein each set is further partitioned into a plurality of sectors, wherein each sector comprises a plurality of the N ways, and wherein each way is configured to store a line; and a cache controller coupled to the cache and configured to detect a relative usage status of each sector in a first set, wherein the cache controller is further configured to detect which sector is a least recently used (LRU) sector when performing a fill in the first set and to fill one of the ways within the LRU sector in the first set by reading a value stored in an LRU pointer register, the value corresponding a sector in the first set.

36. The cache subsystem of claim 35, wherein the cache controller is further configured to fill a LRU way within the LRU sector.

37. The cache subsystem of claim 35, wherein the cache controller is further configured to update the relative usage status of each sector in the first set in response to an operation being performed on one of the ways in the first set that affects a relative usage status of the sectors in the first set.

* * * * *